US012055966B2

(12) United States Patent
Gendai et al.

(10) Patent No.: US 12,055,966 B2
(45) Date of Patent: Aug. 6, 2024

(54) REFERENCE CURRENT SOURCE

(71) Applicant: THINE ELECTRONICS, INC., Tokyo (JP)

(72) Inventors: Yuji Gendai, Tokyo (JP); Shunichi Kubo, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 245 days.

(21) Appl. No.: 17/706,835

(22) Filed: Mar. 29, 2022

(65) Prior Publication Data

US 2022/0317718 A1 Oct. 6, 2022

(30) Foreign Application Priority Data

Mar. 31, 2021 (JP) ................................ 2021-059999

(51) Int. Cl.
*G05F 3/26* (2006.01)
*G05F 3/24* (2006.01)

(52) U.S. Cl.
CPC .............. *G05F 3/262* (2013.01); *G05F 3/242* (2013.01)

(58) Field of Classification Search
CPC . G05F 3/242; G05F 3/245; G05F 3/26; G05F 3/262
See application file for complete search history.

(56) References Cited

U.S. PATENT DOCUMENTS 6,759,893 B2 * 7/2004 Gailhard ................... G05F 3/30 327/542
6,844,772 B2 * 1/2005 Hoon ...................... G05F 3/262 327/539
2017/0017253 A1 * 1/2017 Onishi .................... G05F 3/262
2018/0307262 A1 * 10/2018 Feng ....................... G05F 3/242
2019/0187739 A1 * 6/2019 Sugiura ..................... G05F 3/30
2019/0372527 A1 * 12/2019 Tanoi ........................ G05F 1/46

FOREIGN PATENT DOCUMENTS

JP 2002-244748 A 8/2002

OTHER PUBLICATIONS

Behzad Razavi, "The Bandgap Reference", IEEE Solid-State Circuit Magazine vol. 8, Issue 3, Sep. 2, 2016, pp. 9-12 (4 pages total).

(Continued)

*Primary Examiner* — Alex Torres-Rivera
(74) *Attorney, Agent, or Firm* — Sughrue Mion, PLLC

(57) ABSTRACT

A reference current source includes a reference current path, a first output current path and a second output current path. The reference current path includes a diode-connected first transistor, a diode-connected second transistor, and a first resistor that are connected in series between a first fixed potential and a second fixed potential. The first output current path includes a third transistor having a gate connected to a gate of the second transistor, forming a current mirror together with the second transistor, and a second resistor interposed between the third transistor and the first fixed potential. The second output current path includes a voltage-current conversion circuit to which a potential of a third node between the third transistor and the second resistor in the first output current path is applied and through which a reference current flows.

5 Claims, 9 Drawing Sheets

(56) References Cited

OTHER PUBLICATIONS

R. Jacob Baker, "Voltage References", Chapter 23, CMOS Circuit Design, Layout, and Simulation, Fourth Edition, John Wiley & Sons, Inc., Jul. 2019, pp. 773-802 (30 pages total).

Yen-Ting Wang, Degang Chen, Randall L. Geiger, "A CMOS Supply Insensitive with 13 ppm/° C. Temperature Coefficient Current Reference", 2014 IEEE 57th International Midwest Symposium on Circuits and Systems (MWSCAS), Aug. 2014, pp. 475-478 (5 pages total).

* cited by examiner

REFERENCE CURRENT SOURCE

TECHNICAL FIELD

The present disclosure relates to a reference current source.

BACKGROUND

A reference current source is used in an integrated circuit (IC). The reference current source can generate one or a plurality of reference currents. The reference current or standard current is supplied to a plurality of circuits in a semiconductor chip using a current mirror. The reference current can be used to determine an operating point of each of the circuits in the IC. The reference current source preferably has a structure that is not easily affected by variations or fluctuations in PVT (process, voltage and temperature).

Non-Patent Document 1 discloses a current source utilizing a band-gap reference (BGR), that is, an energy band gap of a semiconductor. This current source has high resistance to a fluctuation of temperature or the like. In the BGR method, a bipolar transistor is used in principle. When a semiconductor chip includes a bipolar transistor in addition to a complementary metal-oxide-semiconductor (CMOS) circuit, manufacturing costs of the semiconductor chip increase.

Non-Patent Document 2 discloses a β-multiplier reference (BMR) circuit. A conventional reference current source can generate a reference current having practical stability even when a power supply potential fluctuates. However, the BMR cannot compensate for temperature characteristics in a state of being a principle circuit.

Non-Patent Document 3 discloses a Widlar current source (a BMR circuit including a CMOS circuit) having a plurality of field effect transistors. A complicated circuit is required to perform temperature compensation.

Patent Document 1 discloses a reference current source including a current mirror. It is considered that this reference current source requires a startup circuit.

CITATION LIST (Patent Document 1) Japanese Unexamined Patent Publication No. 2002-244748.

(Non-Patent Document 1) Behzad Razavi, "The Bandgap Reference," IEEE Solid-State Circuit Magazine, Vol. 8, Issue 3, pp. 9-12, Summer 2016.

(Non-Patent Document 2) R. Jacob Baker, "CMOS Circuit Design, Layout, and Simulation, Fourth Edition," John Wiley & Sons, Chapter 23, July 2019.

(Non-Patent Document 3) Yen-Ting Wang, Degang Chen, Randall L. Geiger, "A CMOS Supply-Insensitive with 13 ppm/° C. Temperature Coefficient Current Reference," 2014 IEEE 57$^{th}$ International Midwest Symposium on Circuits and Systems (MWSCAS), pp. 475-478, August 2014).

SUMMARY

However, when a size of the semiconductor structure is shrunk, a power supply rejection ratio (PSRR) of a reference current supplied to an internal circuit is lowered. Therefore, a reference current source capable of stably supplying a reference current with a simple structure is required.

A first reference current source includes a reference current path including a diode-connected first transistor, a diode-connected second transistor and a first resistor that are connected in series between a first fixed potential and a second fixed potential, a first output current path including: a third transistor having a gate connected to a gate of the second transistor, forming a current mirror together with the second transistor, and a second resistor interposed between the third transistor and the first fixed potential; and a second output current path including a voltage-current conversion circuit to which a potential of a node between the third transistor and the second resistor in the first output current path is applied and through which a reference current flows.

In a second reference current source, a size of the second transistor may be larger than a size of the third transistor.

In a third reference current source, the second transistor may be configured of N transistors (1≤N), the third transistor may be configured of M transistors (1≤M), and a total gate width of the N transistors constituting the second transistor may be K times (1≤K) a total gate width of the M transistors constituting the third transistor.

In a fourth reference current source, the voltage-current conversion circuit may include a fourth transistor having a gate connected to the node, and an output resistor connected between the fourth transistor and the second fixed potential.

In a fifth reference current source, a size of the fourth transistor may be larger than a size of the first transistor.

In a sixth reference current source, a gate length of one transistor of the third transistor may be 100 nm or less and 5 nm or more.

According to the reference current source of the present invention, stability of a reference current can be improved.

DETAILED DESCRIPTION

Figure 1:
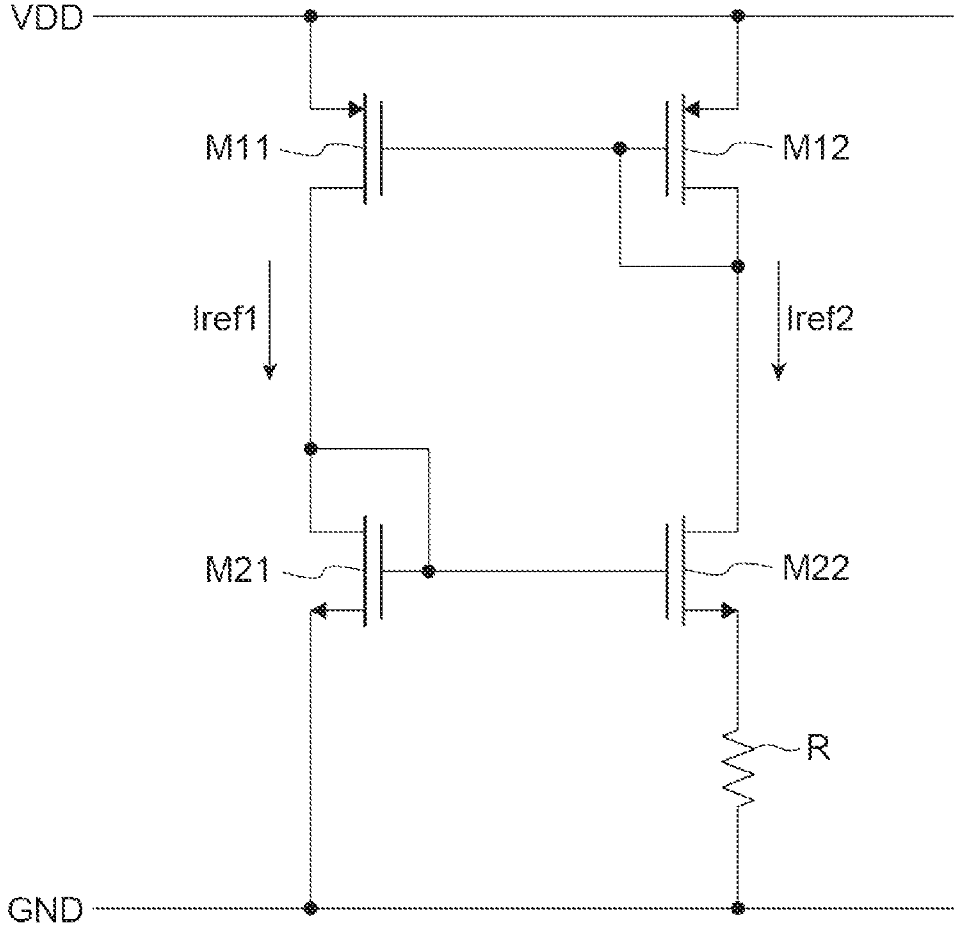
FIG. 1 is a circuit diagram of a reference current source according to a comparative example.

Hereinafter, various exemplary embodiments will be described in detail with reference to the drawings. In addition, the same reference numerals are given to the same or corresponding parts in each of the drawings, and duplicate description will be omitted.

FIG. 1 is a circuit diagram of a reference current source according to a comparative example.

The reference current source shown in FIG. 1 is a μ-multiplier reference (BMR) circuit (a Widlar current mirror current source) equipped with a complementary metal-oxide-semiconductor (CMOS) circuit. The reference current source includes a first upstream transistor M11, a second upstream transistor M12, a first downstream transistor M21, and a second downstream transistor M22. The transistor shown in each of the drawings is a metal-oxide-semiconductor (MOS) field effect transistor.

The first upstream transistor M11 is a P-type MOS transistor, and a source thereof is connected to a first fixed potential VDD. The first downstream transistor M21 is an N-type MOS transistor, a drain thereof is connected to a drain of the first upstream transistor M11, and a source thereof is connected to a second fixed potential GND. A gate and the drain of the first downstream transistor M21 are connected to each other, that is, the first downstream transistor M21 constitutes a diode-connected transistor.

The second upstream transistor M12 is a P-type MOS transistor, and a source thereof is connected to the first fixed potential VDD. The second downstream transistor M22 is an N-type MOS transistor, a drain thereof is connected to a drain of the second upstream transistor M12, and a source thereof is connected to the second fixed potential GND via a resistor R. A gate and the drain of the second upstream transistor M12 are connected to each other, that is, the second upstream transistor M12 constitutes a diode-connected transistor.

The gate of the first upstream transistor M11 and the gate of the second upstream transistor M12 are connected to each other, and this transistor pair forms an upper current mirror. The gate of the first downstream transistor M21 and the gate of the second downstream transistor M22 are connected to each other, and this transistor pair and the resistor R constitute a lower current mirror. In a Widlar current source, the resistor R is connected not to the first downstream transistor M21 but to the second downstream transistor M22 which is not diode-connected.

Here, a gate width W21 of the first downstream transistor M21 and a gate width W22 of the second downstream transistor M22 have a relationship of W22=K×W21. K>1, and a size of the second downstream transistor M22 is larger than a size of the first downstream transistor M21. A gain coefficient β of a transistor is given by β=μ×Cox×(W/L). μ is a mobility of carriers, Cox is a capacity per unit area of a gate oxide film, W is a gate width, and L is a gate length. Assuming that the gate lengths L of the exemplified transistors are all equal, a value of the gain coefficient β or a value of (W/L) is proportional to the gate width W. The second downstream transistor M22 has a gain coefficient β that is K times that of the first downstream transistor M21. The gain coefficient β is proportional to a width (the gate width W) of a channel through which the carriers flow.

On the other hand, the current mirror on the upstream side causes a first reference current Iref1 and a second reference current Iref2 of the same magnitude to flow through left and right lines. Therefore, the first reference current Iref1 flowing through the first downstream transistor M21 and the second reference current Iref2 flowing through the second downstream transistor M22 are equal.

In order to make a drain current Id of a transistor having a large gain coefficient equal to a drain current Id of a transistor having a small gain coefficient β, a gate-source voltage Vgs of the transistor having the large gain coefficient β may be reduced. That is, the gate-source voltage Vgs (M22) of the second downstream transistor M22 having a large gain coefficient β is smaller than the gate-source voltage Vgs(M21) of the first downstream transistor M21 having a small gain coefficient β. Assuming that a difference between the gate-source voltages is δVgs, Vgs(M22)+δVgs=Vgs (M21) is satisfied.

Further, the gate-source voltage Vgs(M21) of the first downstream transistor M21, the gate-source voltage Vgs (M22) of the second downstream transistor M22, and a voltage V(R) between both ends of the resistor R satisfy Vgs(M21)−Vgs(M22)−V(R)=0 from a voltage law of a closed loop including these circuit elements.

Therefore, a voltage applied between both ends of the resistor is V(R)=Vgs(M21)−Vgs(M22)=δVgs. As described above, the voltage V(R)=δVgs between both ends of the resistor R depends on a parameter K that indicates a size of the transistor, but does not depend on the first fixed potential VDD. Assuming that a resistance value of the resistor R is r, the second reference current Iref2 is Iref2=V(R)/r=δVgs/r. As described above, according to the reference current source according to the comparative example, even when the first fixed potential VDD changes, the second reference current Iref2 does not change. However, especially when a size of the semiconductor structure is shrunk, there is room for improvement in the reference current source according to the comparative example. That is, the BMR circuit alone cannot compensate for temperature dependence. Further, due to the shrink in size, an Early voltage becomes smaller, and dependence of a reference current on the power supply voltage (the first fixed potential VDD) becomes larger. In addition, a power supply rejection ratio (PSRR) of the reference current supplied to an internal circuit decreases. Therefore, there is a need for a reference current source that can stably supply a reference current (standard current) with a simple structure when the power supply potential or temperature fluctuates.

Figure 2:
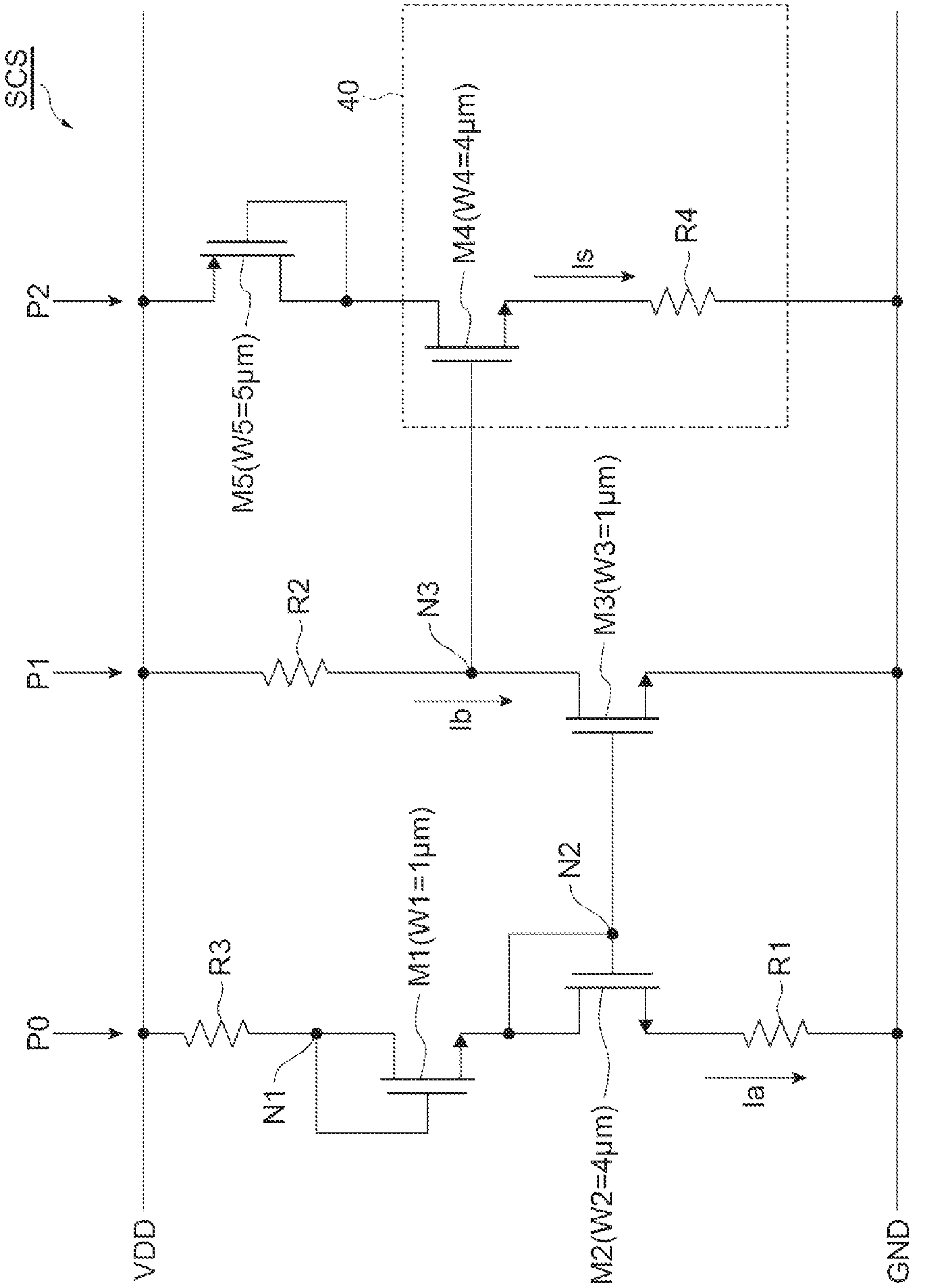
FIG. 2 is a circuit diagram showing a reference current source according to an embodiment.

FIG. 2 is a circuit diagram of a reference current source according to an embodiment. The reference current source SCS according to the embodiment has the following structure.

First, in the reference current source SCS, not only the fluctuation of the output side reference current Is (standard current Is) with respect to the fluctuation of the power supply potential (or the fluctuation of a ground potential) is suppressed, but also the fluctuation of the reference current with respect to change in temperature is small, and a simple structure is provided. The reference current source of the comparative example suppresses the fluctuation of the second reference current Iref2 with respect to the fluctuation of the power supply potential using the BMR circuit, but the BMR circuit alone has large temperature dependence. In the reference current source of the comparative example, the second reference current Iref2 fluctuates greatly with respect to change in temperature. In the reference current source of the comparative example, it was considered that addition of a temperature compensation circuit having a complicated structure is required to reduce the temperature dependence. On the other hand, the reference current source SCS according to the embodiment can perform temperature compensation with a simple structure.

Second, the reference current source SCS has a structure that is operated without an activation circuit. That is, in the reference current source of the comparative example, since a stable state is present even in the case of the second reference current Iref2=0, the activation circuit is required to escape from the stable state. On the other hand, the reference current source according to the embodiment is operated without an activation circuit.

Hereinafter, the reference current source SCS according to the embodiment will be described in detail.

The reference current source SCS according to the embodiment includes a reference current path P0, a first output current path P1, and a second output current path P2 between a power supply line that provides the first fixed potential VDD and a ground line that provides the second fixed potential GND.

The reference current path P0 includes a first transistor M1, a second transistor M2, and a first resistor R1 connected in series between the first fixed potential VDD and the second fixed potential GND. Further, the reference current path P0 includes a third resistor R3 connected between the first fixed potential VDD and the first transistor M1. Positions of the third resistor R3 and the first transistor M1 may be interchanged.

The third resistor R3 is interposed between the first fixed potential VDD and a drain of the first transistor M1. The first transistor M1 is an N-type MOS transistor, and the drain thereof is connected to the third resistor R3, and a source thereof is connected to a drain of the second transistor M2. A gate of the first transistor M1 is connected to the drain thereof and constitutes a diode-connected transistor. The first transistor M1 may be a P-type MOS transistor that is diode-connected, and in this case, the source thereof is connected to the third resistor R3. When the positions of the third resistor R3 and the first transistor M1 are interchanged, and the first transistor M1 is a P-type MOS transistor that is diode-connected, the source of the first transistor M1 is connected to the first fixed potential VDD, and the drain and the gate thereof are connected to the third resistor R3.

The second transistor M2 is an N-type MOS transistor, and a drain thereof is connected to the source of the first transistor M1, and a source thereof is connected to the first resistor R1. A gate of the second transistor M2 is connected to the drain thereof and constitutes a diode-connected transistor. The first resistor R1 is connected between the source of the second transistor M2 and the second fixed potential GND.

The first output current path P1 includes a second resistor R2 and a third transistor M3 connected in series between the first fixed potential VDD and the second fixed potential GND.

The second resistor R2 is interposed between the first fixed potential VDD and a drain of the third transistor M3. The third transistor M3 has a gate connected to the gate of the second transistor M2 and constitutes a current mirror together with the second transistor M2. A source of the third transistor M3 is connected to the second fixed potential GND. The reference current source SCS includes an inverse Widlar current source. In the inverse Widlar current source, the first resistor R1 is connected to the diode-connected second transistor M2 instead of the third transistor M3 constituting the current mirror.

The second output current path P2 includes a fifth transistor M5, a fourth transistor M4, and a fourth resistor R4 connected in series between the first fixed potential VDD and the second fixed potential GND. The fifth transistor M5 is not a constituent element of the reference current source SCS but rather a load of a drain current (a standard current) flowing through the fourth transistor M4. In other words, in the second output current path P2, a circuit belonging to the reference current source SCS is a voltage-current conversion circuit 40.

The fifth transistor M5 is a P-type MOS transistor, a source thereof is connected to the first fixed potential VDD, and a drain thereof is connected to the drain of the fourth transistor M4. The fifth transistor M5 has a gate connected to the drain thereof and constitutes a diode-connected transistor. The fourth transistor M4 is an N-type MOS transistor, a drain thereof is connected to the drain of the fifth transistor M5, and a source thereof is connected to the fourth resistor R4. A gate of the fourth transistor M4 is connected to a third node N3 between the third transistor M3 and the second resistor R2 in the first output current path P1. The fourth resistor R4 (an output resistor) is connected between the source of the fourth transistor M4 and the second fixed potential GND.

The voltage-current conversion circuit 40 is configured of the fourth transistor M4 and the fourth resistor R4. Specifically, the voltage-current conversion circuit 40 includes the fourth transistor M4 having a gate connected to the third node N3, and the fourth resistor R4 connected between the fourth transistor M4 and the second fixed potential GND. A potential of the third node N3 in the first output current path P1 is provided to the voltage-current conversion circuit 40 via the gate of the fourth transistor M4, and the reference current Is (standard current Is) flows therethrough.

Here, an example of a relationship between the sizes of the transistors will be described, but the present invention is not limited to the relationship. A size (a gate width W2) of the second transistor M2 is larger than a size (a gate width W1) of the first transistor M1. Further, a size (a gate width W2) of the second transistor M2 is larger than a size (a gate width W3) of the third transistor M3. A size (a gate width W4) of the fourth transistor M4 is the same as the size (the gate width W2) of the second transistor M2 but is larger than the size (the gate width W1) of the first transistor M1. A size (a gate width W5) of the fifth transistor M5 as a load is larger than the size (the gate width W3) of the third transistor M3. The size of each of the transistors is proportional to the size of the gate width, assuming that the gate lengths are equal to each other.

In this example, W1=1 μm, W2=4 μm, W3=1 μm, W4=4 μm, W5=5 μm, and a relationship of W1=W3<W2=W4<W5 is satisfied. Assuming that K=4, W2=K×W3=K×W1, and W4=K×W3=K×W1. Among the transistors, the smallest transistor is the first transistor M1 or the third transistor M3. Each of the transistors M1 to M5 may be configured of a plurality of the same transistors. When each of the transistors M1 to M5 is configured of a plurality of the same transistors, a total gate width of the same transistors included in each of the transistors M1 to M5 is defined as a gate width of each of the transistors M1 to M5. The gain coefficient β of each of the transistors alone has the same relationship as in the gate width.

A gate length L of one transistor selected from the third transistor M3 having the smallest size is 100 nm or less and 5 nm or more. That is, due to the shrink in size of the transistor, the early voltage is lowered, and the generated reference current Is is greatly affected. When the gate length L is shrunk to 100 nm or less, particularly when the gate length L is shrunk to 50 nm or less, the generated reference current Is is greatly affected. The reference current source SCS aims to improve stability of the reference current (standard current) in the case of the shrink in the size. Therefore, when the gate length L is 100 nm or less, an effect of improving the PSRR of the reference current becomes significant. When the gate length L is 50 nm or less, the effect of improving the PSRR of the reference current becomes more remarkable. When the gate length L is 30 nm or less, the effect of improving the PSRR of the reference current becomes even more remarkable.

Generally, since a transistor having a gate length L of 5 nm or more is known, the present embodiment can be applied to a transistor having a gate length L of 5 nm or more. Of course, even when the circuit of the present embodiment is applied to a transistor having a gate length L of less than 5 nm, the effect of improving the stability of the reference current Is can be expected in principle. When the gate length L is 20 nm or less, it is possible to adopt a transistor having a FinFET structure. In a transistor having a gate length L of 3 nm or less, it is also possible to adopt a transistor having a structure different from the current FinFET structure (improved FinFET, Nanosheet FET, Forksheet FET, CFET, or the like). Each of the transistors M1 to M5 is used in a saturated region as an example and may be operated in an unsaturated region as the power supply voltage drops.

Parameters of each of circuit elements were obtained by performing optimization using short channel models disclosed in Non-Patent Document 2 described above with values designed as will be described later as a guide.

An example of the parameters of each of circuit elements is as follows.

Gate width W1 of the first transistor M1 is 1 μm
Gate length L1 of the first transistor M1 is 100 nm
Gate width W2 of the second transistor M2 is 4 μm
Gate length L2 of the second transistor M2 is 100 nm
Gate width W3 of the third transistor M3 is 1 μm
Gate length L3 of the third transistor M3 is 100 nm
Gate width W4 of the fourth transistor M4 is 4 μm
Gate length L4 of the fourth transistor M4 is 100 nm
Gate width W5 of the fifth transistor M5 is 5 μm
Gate length L5 of the fifth transistor M5 is 100 nm
Resistance value r1 of the first resistor R1 is 5 kΩ
Resistance value r2 of the second resistor R2 is 15 kΩ
Resistance value r3 of the third resistor R3 is 15 kΩ
Resistance value r4 of the fourth resistor R4 is 17 kΩ
First fixed potential VDD is 1.2V
Second fixed potential GND is 0V In the above, 1.2V is adopted as the first fixed potential VDD (the power supply voltage), but the reference current Is can be stabilized even when 1.0V is used. When the parameters are set, first, characteristics of the transistor in a process thereof are grasped. A parameter that can obtain a desired current is selected within a range in which a resistance value or a mounting area of the transistor is reasonable. In an actual design, it has to be conceived that a variation in the size of the transistor does not become too large.

Assuming that a voltage drop in the first transistor M1 is Vf1 and a voltage drop in the second transistor M2 is Vf2, a relationship in a path from the second fixed potential GND to the first fixed potential VDD is 0V+(Ia×r1)+Vf2+Vf1+(Ia×r3)=VDD. That is, when this equation is modified, a reference current Ia is given by Ia=(VDD−Vf1−Vf2)/(r1+r3). Unlike the conventional β-multiplier, the reference current source SCS according to the embodiment does not have a different equilibrium point, and thus an activation circuit (a startup circuit) is not required. The reference current Ia increases monotonically with respect to the first fixed potential VDD, but since the voltage drop Vf (=Vf1 and Vf2) in each of the transistors does not change so much with respect to the reference current ha, a rate of increase of the reference current Ia is larger than a rate of increase of the first fixed potential VDD.

As an example, an amount of fluctuation of a potential of a first node N1 is designed to be about half of an amount of fluctuation of the first fixed potential VDD. For example, an amount of fluctuation of a potential of the first fixed potential ΔV(VDD) is set to 10 mV. In this case, when the reference current Ia does not change, a value of the voltage drop due to the third resistor R3 does not change, and thus the potential of the first node N1 is also increased by 10 mV. In order to cause the amount of fluctuation of the potential of the first node N1 to be half of 10 mV (=5 mV), it is necessary to increase the voltage drop due to the third resistor R3 by 5 mV. At this time, the reference current Ia is increased by ΔIa=5 mV/15 kΩ=⅓ μA. Assuming that the reference current Ia is about 15 μA, a rate of change of the reference current Ia is ΔIa/Ia=about 2%. When the first fixed potential VDD is 1.2V, a rate of fluctuation of the first fixed potential VDD is ΔV(VDD)/VDD=10 mV/1.2V=0.8%.

On the other hand, it is designed so that fluctuation of a first output current Ib is to be twice the fluctuation of the reference current Ia by the current mirror configured of the second transistor M2 and the third transistor M3. When the resistance values of the third resistor R3 and the second resistor R2 coincide with each other (r3=r2), the potential of the third node N3 does not depend on the first fixed potential VDD. For example, as described above, when the first fixed potential VDD is increased by 10 mV, and the reference current Ia increases, and the voltage drop in the third resistor R3 is increased by 5 mV, the potential of the first node N1 is increased by 5 mV. On the other hand, since an amount of increase of the first output current Ib is twice an amount of increase of the reference current Ia, an amount of increase of the voltage drop in the second resistor R2 is 10 mV That is, when the first fixed potential VDD is increased by 10 mV, the voltage drop in the second resistor R2 is increased by 10 mV, and thus an amount of change of voltage thereof cancels out, and the potential of the third node N3 does not change.

The above voltage fluctuation compensation conditions are summarized below.

(Condition 1)

The amount of fluctuation ΔV(N1) of the potential of the first node N1 at a lower end of the third resistor R3 is preferably set to be ½ of the amount of fluctuation ΔV(VDD) of the potential of the first fixed potential VDD (ΔV(N1)=ΔV(VDD)/2). In this case, the amount of change ΔIa of the reference current Ia is obtained by dividing the voltage at both ends of the third resistor R3 by the resistance value r3, and the following relational equation is established. In order to satisfy Condition 1, the parameters of the circuit element in the reference current path P0 are adjusted.

$$\Delta Ia=(\Delta V(VDD)/2)/r3 \qquad \text{(Equation 1)}$$

(Condition 2)

The resistance value r3 of the third resistor R3 and the resistance value r2 of the second resistor R2 are set to be the same. In this case, the following relational equation is established.

$$r2=r3 \qquad \text{(Equation 2)}$$

(Condition 3)

The amount of change ΔIb of the first output current Ib is set to be twice the amount of change ΔIa of the reference current Ia. In this case, the following relational equation is established using Equation 1.

$$\Delta Ib=2\times\Delta Ia=2\times(\Delta V(VDD)/2)/r3=\Delta V(VDD)/r3 \qquad \text{(Equation 3)}$$

When the (Condition 1) to (Condition 3) are satisfied, the amount of change of the potential of the third node N3 becomes zero. That is, since the amount of change $\Delta V(N3)$ of the potential of the third node N3 is given by (an amount of increase of the first fixed potential VDD)−(a voltage drop due to the second resistor R2), and it is represented by $\Delta V(N3)=\Delta V(VDD)-(r2\times\Delta Ib)$. In this Equation, when a value ($\Delta Ib=\Delta V(VDD)/r3$) of Equation 3 and a value ($r2=r3$) of Equation 2 are substituted, it becomes $\Delta V(N3)=\Delta V(VDD)-(r3\times\Delta V(VDD)/r3)=0$.

Of course, based on such a design concept, it is preferable that the parameters of each of the circuit elements be further finely adjusted, and other ratios can be set for each of the parameters. In the reference current source SCS of this example, not only the fluctuation compensation of the reference current Is due to the fluctuation of the power supply voltage but also the fluctuation compensation of the reference current Is due to the change in temperature can be performed by setting each of the parameters. These conditions are examples of circuit design for stabilizing the reference current Is and may be set to parameters that satisfy slightly different conditions from these conditions by optimization using a simulator with parameters that satisfy each of the conditions as a guide.

Figure 4:
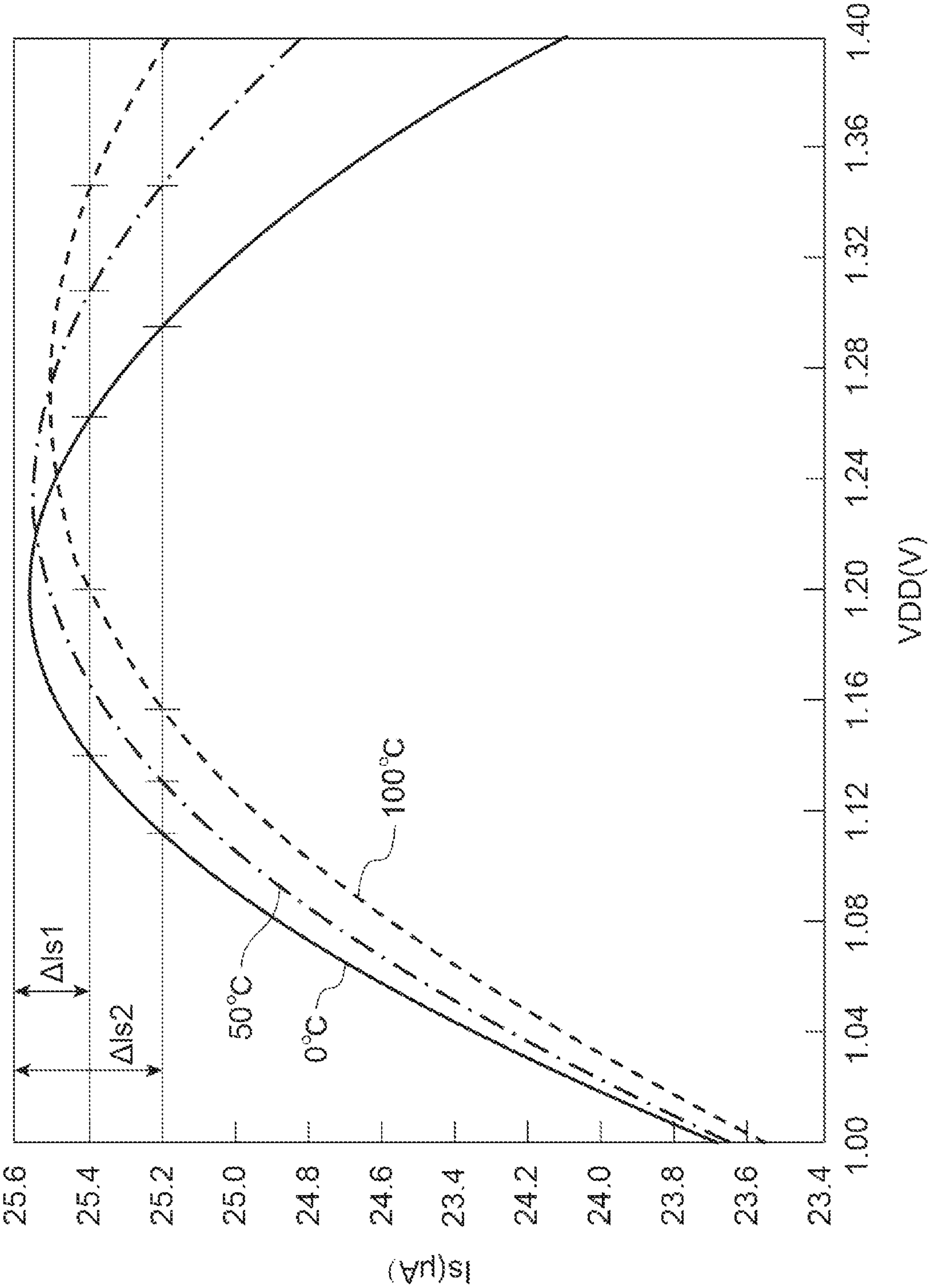
FIG. 4 is a graph showing a relationship between a first fixed potential VDD (V) and a reference current Is (μA).

In the example shown in FIG. 4, the reference current Is is designed so that a range of use is 25 μA or more. Further, the resistance value r1 of the first resistor R1 was set to 5 kΩ, the resistance value r2 of the second resistor R2 was set to 15 kΩ, the resistance value of the third resistor R3 was set to r3=15 kΩ, and these values were set to three times the resistance value r1 of the first resistor R1. Further, a parameter (K times) that indicates the size of the second transistor M2 was set to K=4. Although this value deviates from the condition that Ia=Ib, it is possible to suppress the fluctuation of the reference current Is with respect to the fluctuation of the first fixed potential VDD.

Figure 3:
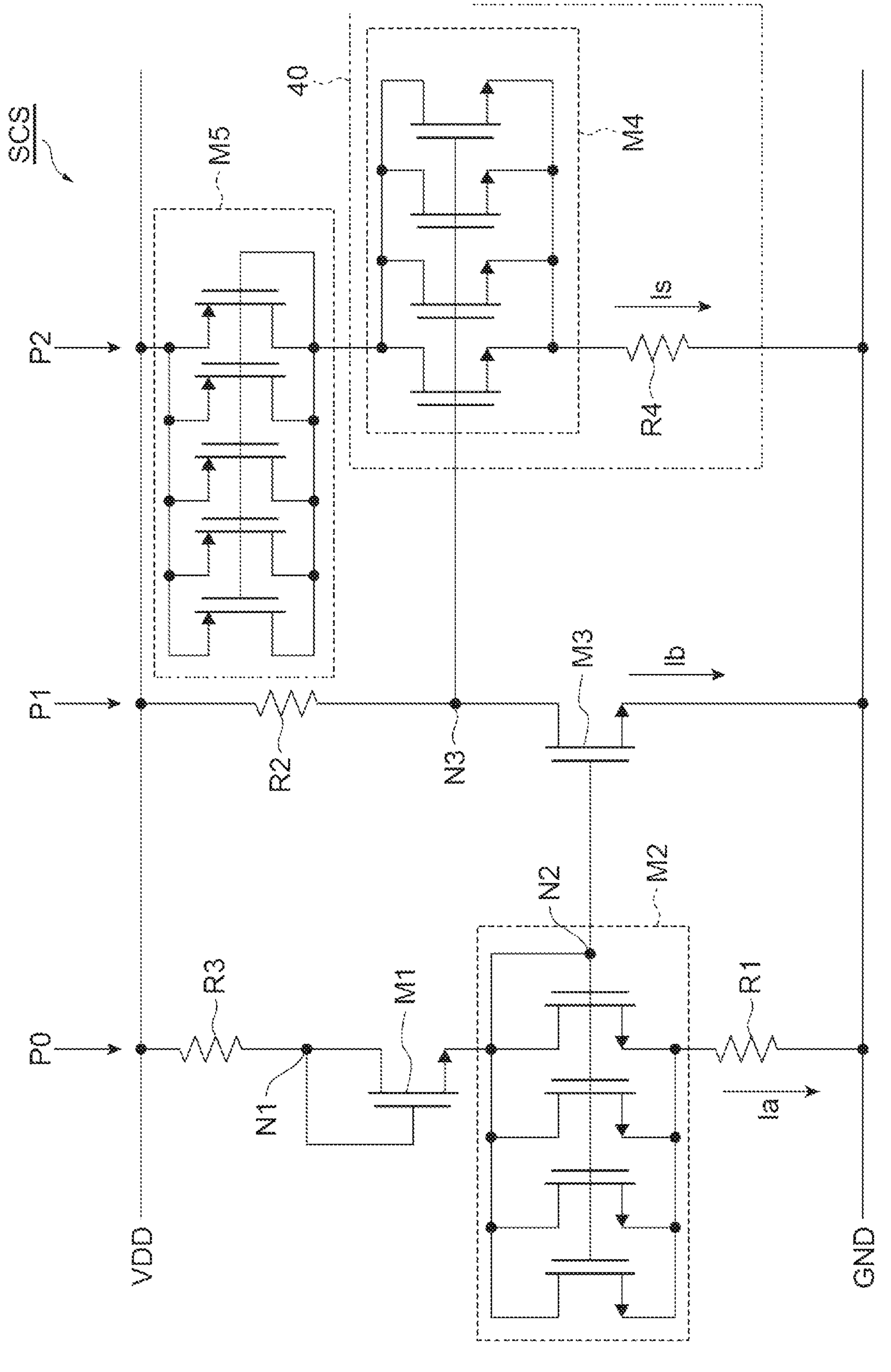
FIG. 3 is a circuit diagram of a reference current source SCS in which each of transistors M2, M4, and M5 is configured of a plurality of the same transistors connected in parallel.

FIG. 3 is a circuit diagram of the reference current source SCS in which each of the transistors M2, M4, and M5 is configured by a plurality of the same transistors connected in parallel.

In this example, each of the transistors M1 to M5 shown in FIG. 2 is configured of one or a plurality of the same transistors connected in parallel. The size of each of transistors is the same. The remaining structure is the same as that shown in FIG. 2. Therefore, the reference current source SCS shown in FIG. 3 is a circuit equivalent to the reference current source SCS shown in FIG. 2.

When each of transistors M1 to M5 is configured of one or a plurality of the same transistors, the total gate width of the same transistors included in each of transistors M1 to M5 is defined as the gate width of each of transistors M1 to M5. The size of each of the transistors M1 to M5 can be compared by comparing these total gate widths. That is, when the second transistor M2 is configured of N ($1\leq N$) transistors and the third transistor M3 is configured of M ($1\leq M$) transistors, the total gate width of the N same transistors constituting the second transistor M2 is K times ($1<K$) the total gate width of the M same transistors constituting the third transistor M3 ($N=K\times M$, $K=4$ in this example). In the drawing, the second transistor M2 is configured of the four same transistors, the fourth transistor M4 is configured of the four same transistors, and the fifth transistor M5 is configured of the five same transistors. The gate width of each of the same transistors is, for example, 1 μm.

FIG. 4 is a graph showing a relationship between the first fixed potential VDD (V) and the reference current Is (μA) in the reference current source shown in FIG. 2.

A range in which the reference current Is is 25.4 μA to 25.6 μA is defined as a first allowable reference current range ΔIs1. A range in which the reference current Is is 25.2 μA to 25.6 μA is defined as a second allowable reference current range ΔIs2.

When the first fixed potential VDD fluctuates from 1.14V to 1.26V at 0° C. (a solid line), the reference current Is is within the first allowable reference current range ΔIs1. When the first fixed potential VDD fluctuates from 1.11V to 1.29V at 0° C. (a solid line), the reference current Is is within the second allowable reference current range ΔIs2.

When the first fixed potential VDD fluctuates from 1.17V to 1.30V at 50° C. (a dashed-dotted line), the reference current Is is within the first allowable reference current range ΔIs1. When the first fixed potential VDD fluctuates from 1.13V to 1.35V at 50° C. (a dashed-dotted line), the reference current Is is within the second allowable reference current range ΔIs2.

When the first fixed potential VDD fluctuates from 1.20V to 1.34V at 100° C. (a dotted line), the reference current Is is within the first allowable reference current range ΔIs1. When the first fixed potential VDD fluctuates from 1.16V to 1.39V at 100° C. (dotted line), the reference current Is is within the second allowable reference current range ΔIs2.

Even when the first fixed potential VDD fluctuates from 1.20 V to 1.26 V and the change in temperatures from 0° C. to 100° C., the reference current Is is within the first allowable reference current range ΔIs1. Even when the first fixed potential VDD fluctuates from 1.16V to 1.29V and the change in temperatures from 0° C. to 100° C., the reference current Is is within the second allowable reference current range ΔIs2. Even when the first fixed potential VDD changes from 1.00V to 1.4V in a temperature range of 0 to 100° C., the reference current is is within the reference current range of 23.4 μA or more and 25.6 μA or less.

From the results shown in FIG. 4, the fluctuation of the power potential is suppressed within a range of $1.2V\times(100-10)\%\leq VDD\leq 1.2V\times(100+10)\%$, and in the temperature range of 0° C. to 100° C., the fluctuation of the reference current Is is suppressed within a range of ±2%.

Next, a guideline for the parameters of each of the circuit elements that satisfies the above (Condition 1) to (Condition 3) will be described.

First, the first transistor M1 constituting the reference current path P0 that defines the (Condition 1) will be considered.

Figure 5:
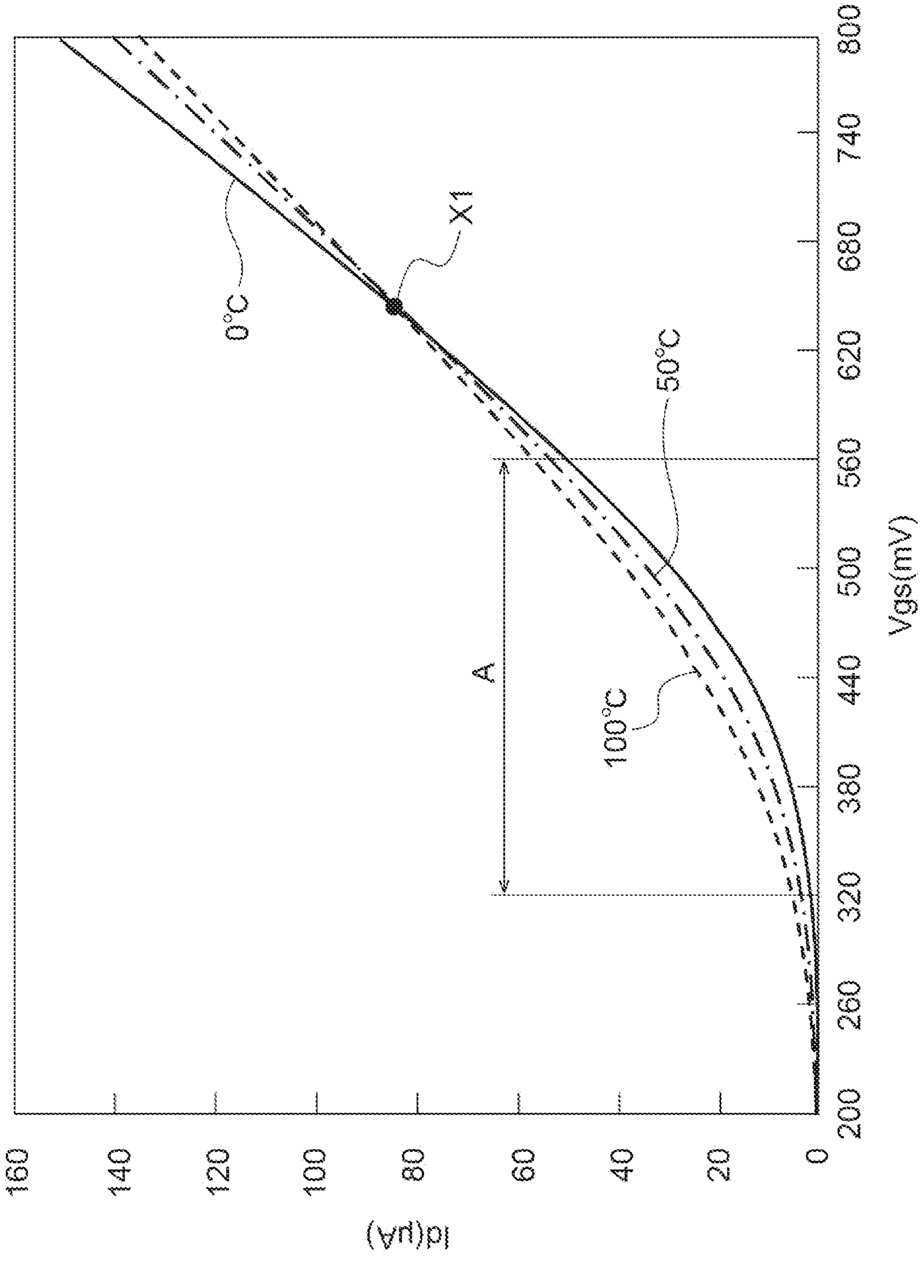
FIG. 5 is a graph showing a relationship between a gate-source voltage Vgs (mV) of one transistor and a drain current Id (μA).

FIG. 5 is a graph showing a relationship between the gate-source voltage Vgs (mV) and the drain current Id (μA) of the diode-connected transistor. This graph shows data at 0° C. (a solid line), 50° C. (a dashed line), and 100° C. (a dotted line). FIG. 5 is a graph relating to the characteristics of the first transistor M1, but it can also be used when the characteristics of the third transistor M3 is considered.

As the gate-source voltage Vgs increases, the drain current Id increases. In the reference current source according to the embodiment, the gate-source voltage Vgs is designed to use the standard voltage $Vgs_0$. A fluctuation width of the gate-source voltage Vgs from the standard voltage $Vgs_0$ is referred to as $|\Delta Vgs|$. A preferred example of a usage range A of the gate-source voltage Vgs when the transistor is turned on is $(|Vgs_0|-|\Delta Vgs|)\leq|Vgs|\leq(|Vgs_0|+|\Delta Vgs|)$. For example, when the standard voltage $Vgs_0$ is 440 mV and the fluctuation width $|\Delta Vgs|$ is 120 mV, 320 mV$\leq|Vgs|\leq$5560 mV is exemplified. For example, when the standard voltage $Vgs_0$ is 400 mV, 280 mV$\leq|Vgs|\leq$520 mV is exemplified. The usage range A thereof is an example, and when a current to be handled is reduced, the standard voltage $|Vgs_0|$ and the fluctuation width |ΔVgs| can be further reduced. When the transistor is a N-channel type, the gate-source voltage is positive, and when the transistor is a P-channel type, the gate-source voltage is negative, and thus a magnitude (an absolute value) of the gate-source voltage is set as described above.

At the gate-source voltage Vgs higher than the gate-source voltage Vgs in the usage range A, there is a fixed point X1 in which the drain current Id does not fluctuate with respect to the change in temperature. In other words, in the reference current source SCS according to the embodiment, the gate-source voltage Vgs smaller than the gate-source voltage Vgs that provides the fixed point X1 is used. In this case, the drain current Id fluctuates with respect to the change in temperature, but as described above, the change in the reference current Is can be suppressed as a whole of the reference current source SCS.

The fixed point X1 will be supplementarily described.

The drain current Id of the transistor generally follows $Id=\beta/2\times(Vgs-VT)^2$. VT is a threshold voltage of the transistor. It is known that two constants β and VT become smaller as the temperature increases. As the temperature becomes higher, a rising voltage of a IV curve is lowered, and a slope becomes smaller. Therefore, when the source of the transistor is connected to the second fixed potential GND, a position of the IV curve for each temperature is reversed when Vgs becomes a specific voltage or higher. A reversed point is approximately the fixed point X1.

At the gate-source voltage Vgs below the fixed point X1, the drain current Id increases as the temperature increases, and at the gate-source voltage Vgs above the fixed point X1, the drain current Id decreases as the temperature increases. A circuit using the voltage of the fixed point X1 shown in the drawing can be considered, but it is difficult to use because the voltage is too high.

In the data curve of the current-voltage characteristic shown in FIG. 5, when a tangent line is drawn near Vgs=500 mV, the tangent line of the data curve intersects a horizontal axis near 350 mV, and a slope of the tangent line is about 0.25 mS. This can be applied to the current-voltage characteristics of the third transistor M3. In order for the amount of change ΔIb of the first output current Ib to be set to twice the amount of change ΔIa of the reference current Ia, at a specific operating point (example: an intersection point X0 in FIG. 7), it is appropriate to set the resistance value r1 of the first resistor R1 to a value close to a reciprocal number of a transconductance of the third transistor M3 (the slope of the tangent line (about 0.25 mS)). Therefore, the resistance value r1 of the first resistor R1 is set to about 4 kΩ as an initial value of correction with a reciprocal number of this slope being appropriate as a guide. This value is a guideline value and is not a numerical value finally optimized (example: 5 kΩ) but can be used as a guideline for optimization in order to obtain the characteristics of FIG. 4.

Next, series combined resistance of the second transistor M2 and the first resistor R1. For example, the guideline for the series combined resistance value (rM2+r1) of on-resistance rM2 of the second transistor M2 and the resistance value r1 of the first resistor R1 is set to about twice on-resistance rM1 of the first transistor M1 (rM2+r1=rM1×2=8 kΩ). Since the second transistor M2 can pass a current four times that in the third transistor M3, the on-resistance rM2 is set to, for example, 1 kΩ. These values are guidelines, and the resistance value r1 of the first resistor R1 actually optimized by a simulator is 5 kΩ.

Next, the third resistor R3 is considered. When the series combined resistance of the second transistor M2 and the first resistor R1 is 8 kΩ, the guideline for the resistance value r3 of the third resistor R3 is set to r3=rM1+rM2+r1=4 kΩ+8 kΩ=12 kΩ to satisfy the above (Condition 1).

Next, the second resistor R2 is considered. Due to the above (Condition 2), the guideline of the resistance value r2 of the second resistor R2 is r2=r3=12 kΩ. These values are guidelines, and the resistance value r2 and the resistance value r3 actually optimized by the simulator are both 15 kΩ.

When the guideline of the parameters thereof is used, assuming that Vgs of each of the first transistor M1 and the third transistor M3 is 0.5V, when VDD=1.2V, 0.2V is applied to both ends of the third resistor R3. In this case, the reference current Ta is 16.7 μA according to Ohm's law. Referring to FIG. 5, this current value is a little smaller than expected. Therefore, using these parameters as the guideline, the parameters of each of the circuit element are adjusted and corrected. Actually, the parameters of each of the circuit elements were optimized with such a numerical value as a guideline using a simulator such as "LTspice" so that the fluctuation of the reference current Is with respect to the fluctuation of the voltage and the fluctuation of the temperature was minimized, and the parameters of each of the circuit elements described above were obtained. When the parameters optimized for obtaining the graph of FIG. 4 are used, characteristics of FIG. 6 are obtained.

Figure 6:
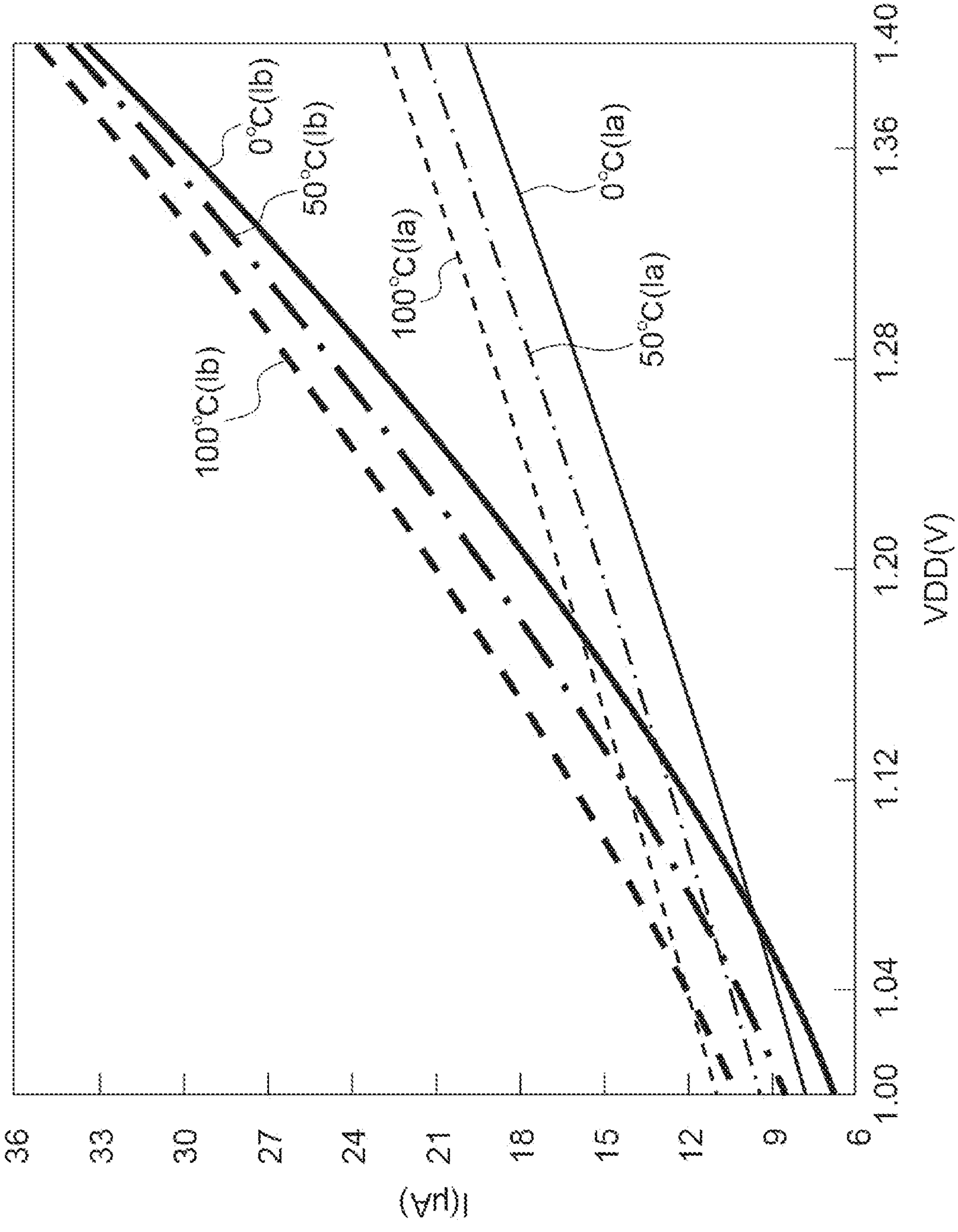
FIG. 6 is a graph showing a relationship between the first fixed potential VDD (V) and a reference current Ia (μA) and a first output current Ib (μA).

FIG. 6 is a graph showing a relationship between the first fixed potential VDD(V) and the reference current Ia (μA) and the first output current Ib (μA).

At 0° C. (a thin solid line), the reference current Ia (μA) increases as the first fixed potential VDD(V) increases. At 0° C. (a thick solid line), the first output current Ib (μA) increases with a larger slope than the reference current Ia (μA), and the voltage drop at the second resistor R2 increases. The increase in the first fixed potential VDD and the voltage drop in the second resistor R2 tend to cancel each other out at the third node N3. Therefore, the fluctuation of the potential of the third node N3 due to the fluctuation of the first fixed potential VDD is suppressed.

At 50° C. (a thin dashed-dotted line), the reference current Ia (μA) increases as the first fixed potential VDD(V) increases. At 50° C. (a thick dashed-dotted line), the first output current Ib (μA) increases with a larger slope than the reference current Ia (μA), and the voltage drop at the second resistor R2 increases. Therefore, even in the case of 50° C., the fluctuation of the potential of the third node N3 due to the fluctuation of the first fixed potential VDD can be suppressed as in the case of 0° C.

At 100° C. (a thin dotted line), the reference current Ia (μA) increases as the first fixed potential VDD(V) increases. At 100° C. (a thick dotted line), the first output current Ib (μA) increases with a larger slope than the reference current Ia (μA), and the voltage drop in the second resistor R2 increases. Therefore, even in the case of 100° C., the fluctuation of the potential of the third node N3 due to the fluctuation of the first fixed potential VDD is suppressed as in the case of 0° C.

When the fluctuation of the potential of the third node N3 is suppressed, the fluctuation of the potential applied to the gate of the fourth transistor M4 is suppressed, and thus the fluctuation of the reference current Is flowing through the fourth transistor M4 is suppressed.

However, in the above-described (Condition 3), the amount of change ΔIb of the first output current is set to be twice the amount of change ΔIa of the reference current Ia. In order to satisfy such a condition, a reverse Wildlar current mirror is used in the reference current source of the present embodiment. In the inverse Widlar current mirror, the first resistor R1 is disposed on the downstream side of the second transistor M2, and the size of the second transistor M2 and the size of the third transistor M3 are different from each other. In the example shown in FIG. 2, the size of the third transistor M3 is smaller than that of the second transistor M2, and the amount of change of the first output current Ib can be almost twice the amount of change of the reference current Ia. Hereinafter, the operation of the inverse Widlar current mirror will be supplementarily described.

Figure 7:
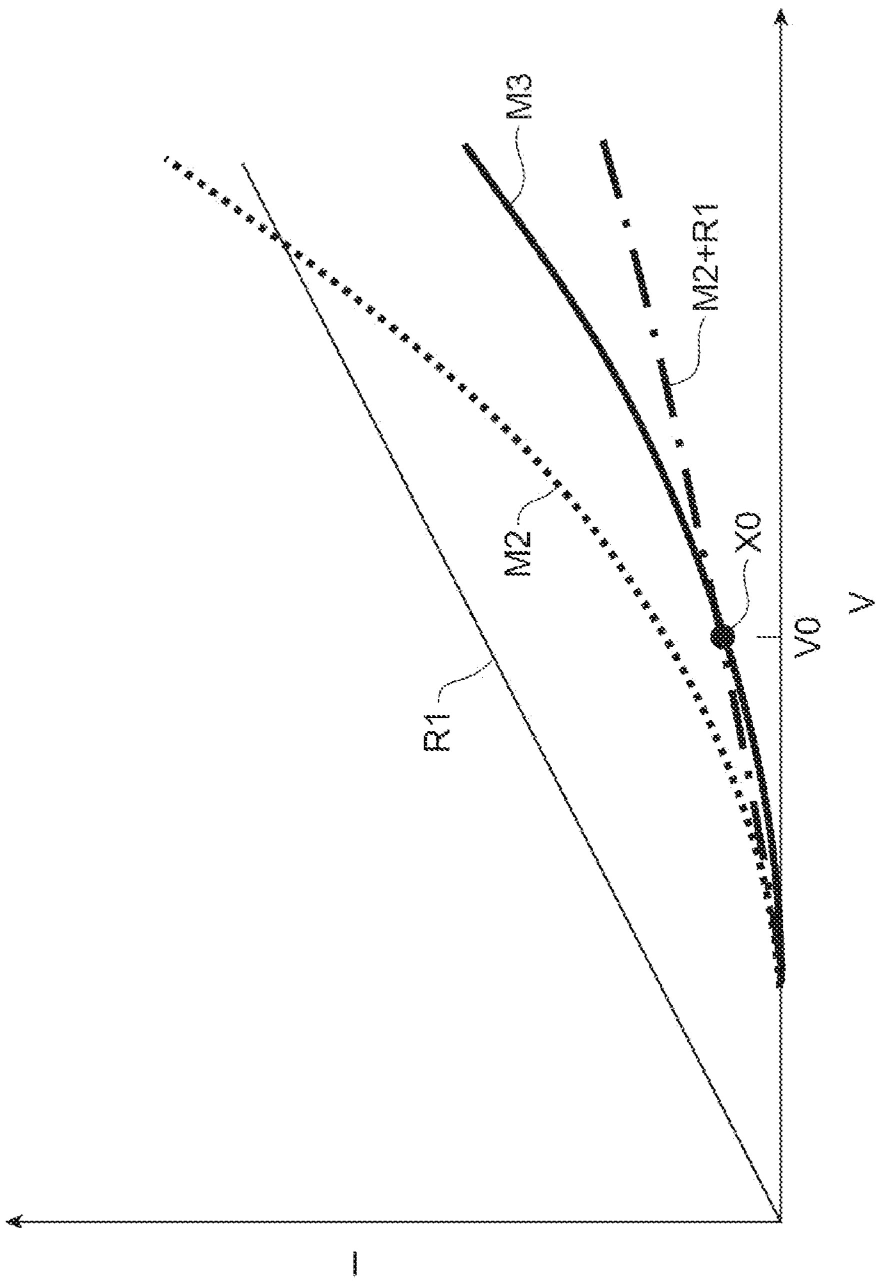
FIG. 7 is a conceptual graph showing a relationship between a voltage V and a current I applied to a circuit element.

FIG. 7 is a conceptual graph showing a relationship between a voltage V and a current I applied to the circuit element, and is a diagram for describing the inverse Wildar current mirror.

A thick solid line (M3) in FIG. 7 shows the characteristics of the drain current Td with respect to the change in the gate-source voltage Vgs of the third transistor M3. When the size of the second transistor M2 is K times that of the third transistor M3, a current shown by a dotted line in FIG. 7 (the second transistor M2) becomes K times a current shown by a thick line in FIG. 7 (the third transistor M3). This is shown by a dotted line (M2) in FIG. 7.

The current I flowing through the first resistor R1 increases linearly in proportion to the voltage V between both ends of the resistor (a thin solid line (R1) in FIG. 7). When the first resistor R1 and the second transistor M2 are connected in series as in the reference current source SCS, since the same current flows therethrough, resultant IV characteristic can be obtained by adding a horizontal axis (V) at the same vertical axis (current). This is shown by a dashed-dotted line (M2+R1) in FIG. 7. The gate-source voltage Vgs (a thick solid line (M3) in FIG. 7) of the third transistor M3 coincides with a voltage (one-dot chain line (M2+R1) in FIG. 7) between the gate (the second node N2 in FIG. 2) of the second transistor M2 and the second fixed potential GND at the intersection point X0 (a voltage V0). That is, at a common gate potential V0, the drain current Id flowing through the second transistor M2 and the drain current Id flowing through the third transistor M3 are equal. When the size of the second transistor M2 is increased (k times), a position of the intersection point X0 moves to the right on the thick solid line (M3), and the voltage V0 increases.

A slope of a tangent line of the dashed-dotted line (M2+R1) at the intersection point X0 can be approximately half a slope of a tangent line of the dotted line (M2) by starting from a point in which the resistance value r1 of the first resistor R1 and the reciprocal number rM3 of the transconductance of the third transistor M3 are the same and adjusting K and r1. In this case, approximately twice the change in the reference current Ia is the change in the first output current Ib.

When the condition of the intersection point X0 is satisfied, a ratio of the amount of change ΔIa of the reference current Ta flowing through the reference current path P0 (the second transistor M2) to the amount of change ΔV of the voltage is ka=(ΔIa/ΔV). A ratio of the amount of change ΔIb of the first output current Ib flowing through the first output current path P1 (the third transistor M3) to the amount of change ΔV of the voltage is kb=(ΔIb/ΔV). As an example, these ratios are set to be ka:kb=1:2. In short, when the first fixed potential VDD (the power supply potential) increases and the reference current Ia flowing through the reference current path P0 increases, the first output current Ib tends to be increased to twice the reference current Ia. When the first fixed potential VDD increases and the potential of the drain (the third node N3 in FIG. 2) of the third transistor M3 tries to increase, the first output current Ib flowing through the third transistor M3 increases, the voltage drop in the second resistor R2 becomes large, and the fluctuation of the potential of the third node N3 is suppressed.

Further, assuming that the voltage drop for one transistor is Vf, when 2×Vf+α≤the first fixed potential VDD (a is a voltage effect due to resistance or the like) is set, the reference current source is operated by this minimum voltage.

These are design guidelines, and in practice, the parameters of the circuit elements are further adjusted using a circuit simulator so that the graph of FIG. 4 can be obtained.

In the reference current source according to the above-described embodiment, as a schematic operation, the potential of the first node N1 increased by 2×Vf from the second fixed potential GND due to the second transistor M2 and the first transistor M1 is moved to the third node N3 located downstream of the second resistor R2 using a current mirror configured of the second transistor M2, the third transistor M3 and the first resistor R1, and a voltage obtained by lowering the potential of the third node N3 by Vf in the fourth transistor M4 is applied to the fourth resistor R4 (the output resistor).

The fluctuation compensation of the reference current Is with respect to the fluctuation of temperature will be described. The reference current source SCS also compensates for fluctuations in the power supply potential and is an excellent circuit in which the temperature compensation can also be performed as described above by fine-adjusting the parameters of each of the circuit elements using a simulator.

The resistor used to obtain the characteristics of FIG. 4 is an ideal resistor of which a resistance value hardly changes with respect to temperature rise. When various resistors are configured of the on-resistance of a transistor, the resistance value increases with the temperature rise, but when the change in the resistance value changes the reference current Is, if necessary, the parameters of the circuit element may be recalculated and set using a simulator so that the change of the reference current Is with respect to the change in temperature is suppressed.

As described above, the above-described reference current source SCS can suppress the fluctuation of the reference current Is with a simple structure with respect to the fluctuation of the power supply potential (the fluctuation of the first fixed potential VDD). Further, the reference current source SCS can reduce the temperature dependence. That is, the reference current Ia has temperature characteristics regarding a voltage drop (referred to as 2×Vf) corresponding to two transistors in the reference current path P0. The third node N3 has temperature characteristics regarding a voltage drop (referred to as 1×Vf) corresponding to one transistor in the first output current path P1. In this circuit, when the fourth resistor R4 does not have the temperature characteristics, the temperature characteristics of the potential of the source of the fourth transistor M4 can be eliminated, and the reference current Is with small temperature dependence can be obtained. As described above, in the case of the reference current Ia the first output current Ib and the resistance value r3 of the third resistor R3=the resistance value r2 of the second resistor R2, the temperature characteristics of the potential of the second node N2 and the temperature characteristics of the potential of the third node N3 are substantially the same. Since the temperature characteristics have a characteristic of voltage fluctuation corresponding to Vf of one transistor, when the potential of the fourth transistor M4 is lowered by Vf, a voltage applied to both ends of the fourth resistor R4 has almost no temperature dependence.

Figure 8:
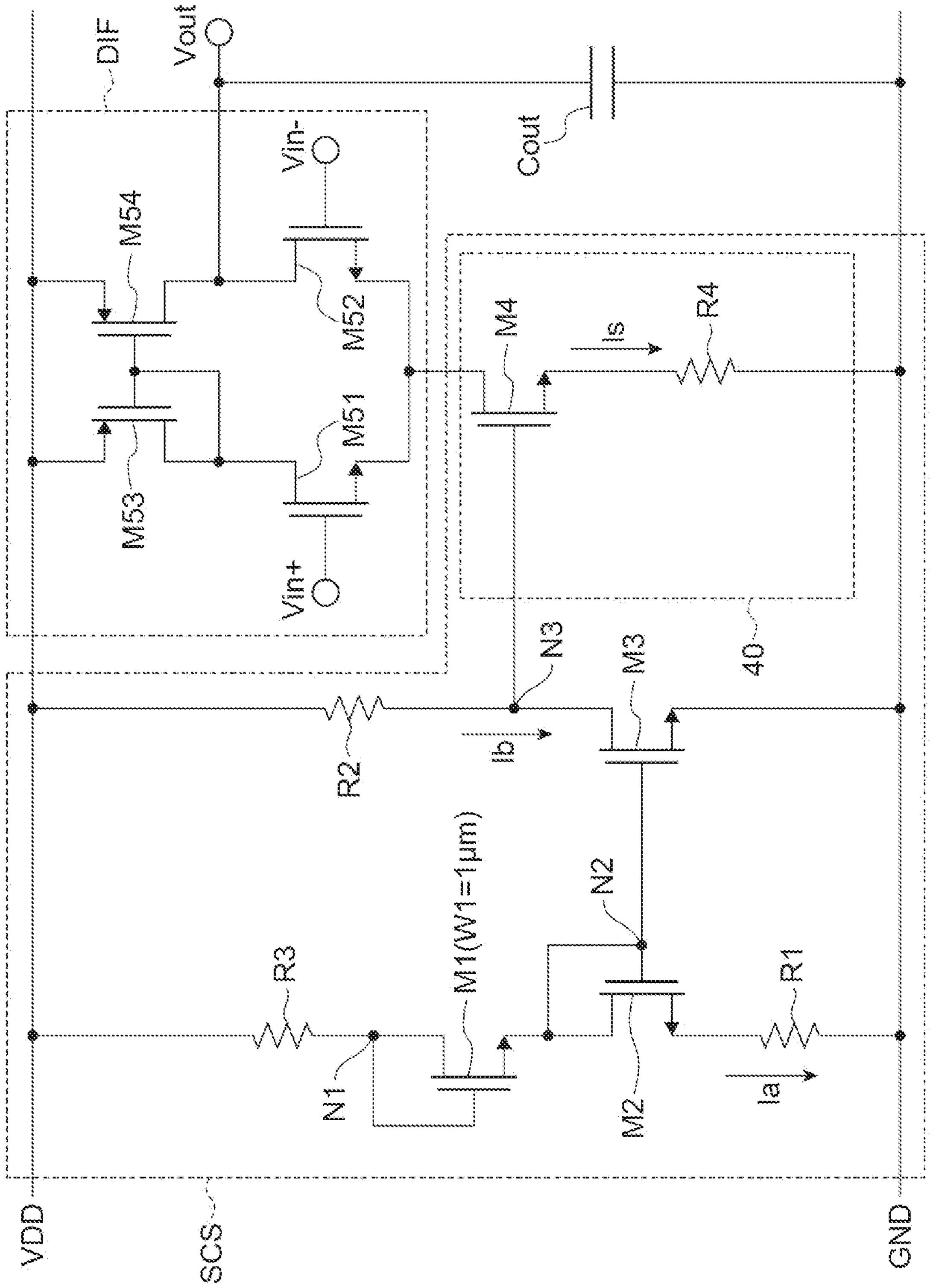
FIG. 8 is a circuit diagram of a device including a circuit for extracting the reference current Is from the reference current source SCS.

FIG. 8 is a circuit diagram of a device including a circuit for extracting the reference current Is (standard current Is) from the reference current source SCS. There are innumerable usage patterns of the reference current source SCS, but an example is shown here.

Instead of the fifth transistor M5 shown in FIG. 2, a differential circuit DIF is provided between the first fixed potential VDD and the fourth transistor M4. The differential circuit DIF includes a positive input transistor M51, a negative input transistor M52, a reference transistor M53, and an output transistor M54.

The positive input transistor M51 is an N-type MOS transistor, a positive input signal is applied to a gate thereof, and a source thereof is connected to the drain of the fourth transistor M4. The negative input transistor M52 is an N-type MOS transistor, a negative input signal is applied to a gate thereof, and a source thereof is connected to the drain of the fourth transistor M4. The reference transistor M53 is a P-type MOS transistor, a gate thereof is connected to a drain and a drain of the positive input transistor M51, and a source thereof is connected to the first fixed potential VDD. The output transistor M54 is a P-type MOS transistor, a gate thereof is connected to the gate of the reference transistor M53, a source thereof is connected to the first fixed potential VDD, and a drain thereof is connected to the drain of the negative input transistor M52. A drain of the output transistor M54 is connected to an output terminal Vout, and a capacitor Cout is interposed between the output terminal Vout and the second fixed potential GND.

The reference current Is flows through the fourth transistor M4 and the fourth resistor R4. The reference current source SCS provides the reference current Is flowing through the differential circuit DIF, and a differential signal is output from the output terminal Vout according to a differential input. A circuit that can be connected to the reference current source SCS is not limited to the differential circuit DIF, and other amplifiers and the like can be connected.

Figure 9:
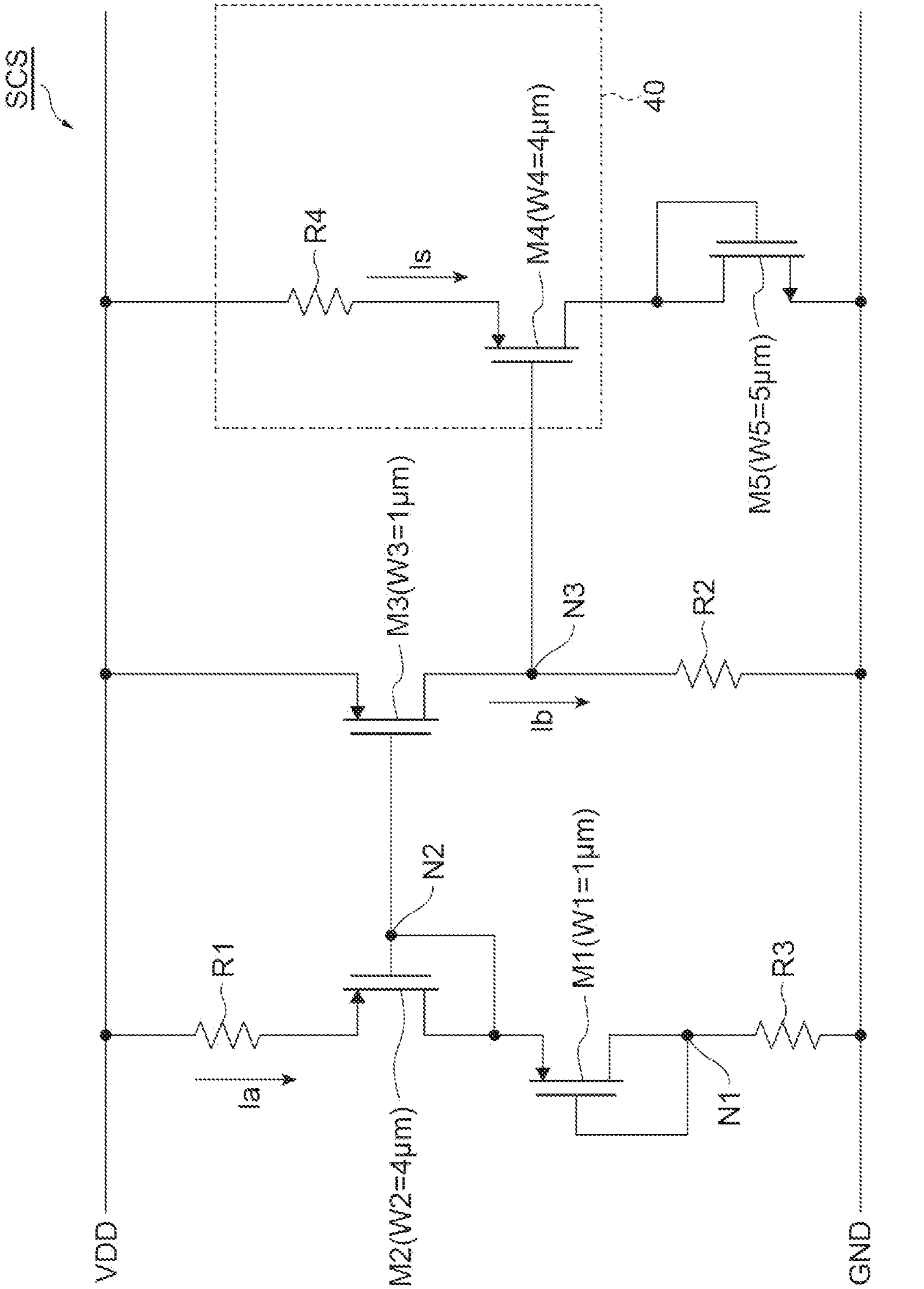
FIG. 9 is a circuit diagram of a reference current source according to another embodiment.

FIG. 9 is a circuit diagram of a reference current source according to another embodiment.

The reference current source SCS shown in FIG. 9 is formed by replacing the N-type MOS transistor and the P-type MOS transistor in the reference current source SCS shown in FIG. 2 with each other. That is, the first fixed potential VDD shown in FIG. 2 was replaced with a fixed potential GND (a ground potential). The second fixed potential GND shown in FIG. 2 was replaced with a fixed potential VDD (a power supply potential). Other structures are the same as those shown in FIG. 2. As described above, the transistor includes an N-channel type (NMOS type) transistor and a P-channel type (PMOS type) transistor, and they can be operated in the same manner even when they are replaced with each other.

As described above, the reference current source SCS according to the embodiment includes the reference current path P0 including the diode-connected first transistor M1, the diode-connected second transistor M2, and the first resistor R1 that are connected in series between the first fixed potential VDD and the second fixed potential GND, a first output current path P1 including: a third transistor M3 having a gate connected to a gate of the second transistor M2, forming a current mirror together with the second transistor M2, and a second resistor R2 interposed between the third transistor M3 and the first fixed potential VDD (the first fixed potential is the ground potential in FIG. 9), and the second output current path P2 including the voltage-current conversion circuit 40 to which the potential of the third node N3 between the third transistor M3 and the second resistor R2 in the first output current path P1 is applied and through which the reference current (standard current) flows.

According to the reference current source SCS, the parameters of the circuit elements are appropriately set, and the stability of the reference current Is can be improved. That is, even when the power supply potential or the ground potential fluctuates or the temperature fluctuates, the potential of the third node N3 is relatively suppressed, and the fluctuation of the reference current Is depending on the potential of the third node N3 can be suppressed. Further, the reference current source SCS can perform the temperature compensation without providing a complicated temperature compensation circuit, but does not prevent the temperature compensation circuit from being separately provided.

In the reference current source SCS according to the embodiment, the size of the second transistor M2 is larger than the size of the third transistor M3. When the first fixed potential VDD fluctuates, the first output current Ib flowing through the third transistor M3 changes more than the reference current Ta flowing through the second transistor M2. Therefore, the voltage drop at the second resistor R2 increases, and the fluctuation of the potential at the third node N3 is further suppressed. Therefore, the stability of the reference current Is can be improved.

In the reference current source SCS according to the embodiment, the second transistor M2 is configured of N ($1 \leq N$) transistors, the third transistor M3 is configured of M ($1 \leq SM$) transistors, and the total gate width of the N transistors constituting the second transistor M2 is K times ($1<K$) the total gate width of the M transistors constituting the third transistor M3. That is, one transistor may be configured by connecting a plurality of sub-transistors in parallel.

In the reference current source SCS according to the embodiment, the voltage-current conversion circuit 40 includes the fourth transistor M4 having the gate connected to the third node N3 and the fourth resistor (the output resistor) connected between the fourth transistor M4 and the second fixed potential GND. Various structures are known as a structure of the voltage-current conversion circuit 40, but this structure has an advantage of being simple.

In the reference current source SCS according to the embodiment, the size of the fourth transistor M4 is larger than the size of the first transistor M1. When the size of the fourth transistor M4 is made larger than the size of the first transistor M1 and is about the same as the size of the second transistor M2, the temperature dependence of the reference current Is tends to decrease. Therefore, the stability of the reference current Is can be improved.

In the reference current source SCS according to the embodiment, the gate length of one transistor of the third transistor M3 is 100 nm or less and 5 nm or more. That is, when the size of the semiconductor structure is shrank, since the fluctuation of the reference current Is due to an external factor tends to be large, the effect of the reference current source SCS according to the embodiment is more remarkable under such conditions.

As described above, the reference current source according to the embodiment can obtain a reference current that is insensitive to both power supply voltage fluctuations and fluctuation of temperatures with a simple circuit. The reference current source is configured only of resistors and field effect transistors, thus the need for bipolar transistors which were essential in BGR circuits is eliminated. Therefore, the reference current source can be manufactured by a normal CMOS process. Although the above-described transistor is an enhancement type transistor, a depletion type transistor can also be used. Further, the first resistor R1, the second resistor R2, and the third resistor R3 can be configured using the on-resistance of the transistor or the like. The connection of the circuit elements described above is a direct electrical connection, but another element may be interposed between the circuit elements as long as it does not substantially affect the circuit operation. In addition, the above-described numerical values have a desired effect even when an error of at least 10% is included.

What is claimed is:

1. A reference current source comprising:

a reference current path including a diode-connected first transistor, a diode-connected second transistor and a first resistor that are connected in series between a first fixed potential and a second fixed potential;

a first output current path including:

a third transistor having a gate connected to a gate of the second transistor, forming a current mirror together with the second transistor, and a second resistor interposed between the third transistor and the first fixed potential; and a second output current path including a voltage-current conversion circuit to which a potential of a node between the third transistor and the second resistor in the first output current path is applied and through which a reference current flows, wherein the reference current path includes a third resistor which is connected in series between the first fixed potential and the second fixed potential; and the voltage-current conversion circuit includes:

a fourth transistor having a gate connected to the node; and an output resistor connected between the fourth transistor and the second fixed potential.

2. The reference current source according to claim 1, wherein a size of the second transistor is larger than a size of the third transistor.

3. The reference current source according to claim 1, wherein:

the second transistor is configured of N transistors, wherein $1 \leq N$;

the third transistor is configured of M transistors, wherein $1 \leq M$; and a total gate width of the N transistors constituting the second transistor is K times a total gate width of the M transistors constituting the third transistor, wherein $1 < K$.

4. The reference current source according to claim 1, wherein a size of the fourth transistor is larger than a size of the first transistor.

5. The reference current source according to claim 1, wherein a gate length of one transistor of the third transistor is 100 nm or less and 5 nm or more.

* * * * *